March 21, 1939. J. GALAMB 2,151,424
VEHICLE BATTERY CONSTRUCTION
Filed Oct. 19, 1936

INVENTOR.
BY J. Galamb.
ATTORNEY.

Patented Mar. 21, 1939

2,151,424

UNITED STATES PATENT OFFICE 2,151,424

VEHICLE BATTERY CONSTRUCTION

Joseph Galamb, Detroit, Mich., assignor to Ford Motor Company, Dearborn, Mich., a corporation of Delaware Application October 19, 1936, Serial No. 106,398

2 Claims. (Cl. 136—180)

The object of my invention is to provide a vehicle battery with means for conducting the gases therefrom to a point spaced from the battery. In the past it has been usual practice to provide vehicle batteries with filler opening caps having a small air vent therein whereby the gases produced when the battery is being charged may escape. This construction is satisfactory where the battery is placed underneath the car body, as the fumes and acid vapor are discharged beneath the car and thus cause no appreciable damage. However, the trend in automobile design is to lower car bodies and consequently the floor boards of the modern automobile are quite close to the ground. The chassis frame, which in former days had a depth of as much as ten inches, is now sometimes constructed of rectangular tubing which is built into the body structure and has a depth of only four or five inches. In all chassis the frame or body supporting member is very shallow in order that the minimum ground clearance may be maintained and still have the floor boards of the car kept as low as possible.

Due to this shallow frame construction now universally employed, there is no longer sufficient depth for the battery beneath the floor boards of the car. The battery has, therefore, been placed in the engine compartment upon a shelf which extends forwardly from the front face of the vehicle dash. The disadvantage of this location is that the gases discharged from the battery, together with small amounts of acid in the fumes, collect on the engine and cause the various motor accessories to rust. The object of my invention is, therefore, to provide a simple and effective means for conducting the gases from the battery to a point beneath the frame of the vehicle and thereby prevent rusting of the engine parts due to this cause.

A further object of my invention is to provide a single manifold that is fastened over the top of the battery, which manifold forms a cap for each of the filler openings of the battery cells. The removal of this single manifold will thus allow all three cells to be inspected.

With these and other objects in view, my invention consists in the arrangement, construction and combination of the various parts of my improved device, as described in the specification, claimed in my claims, and illustrated in the accompanying drawing, in which:

Figure 1:
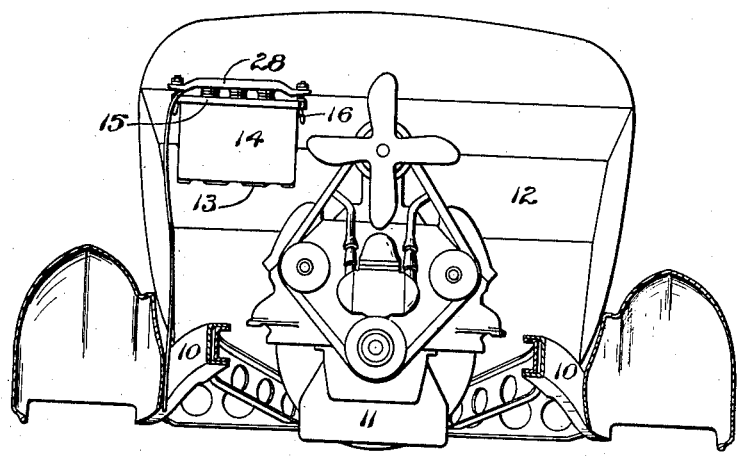
Figure 1 is a cross-sectional view through the engine compartment of a modern motor vehicle having my improved battery installed therein.
Figure 2:
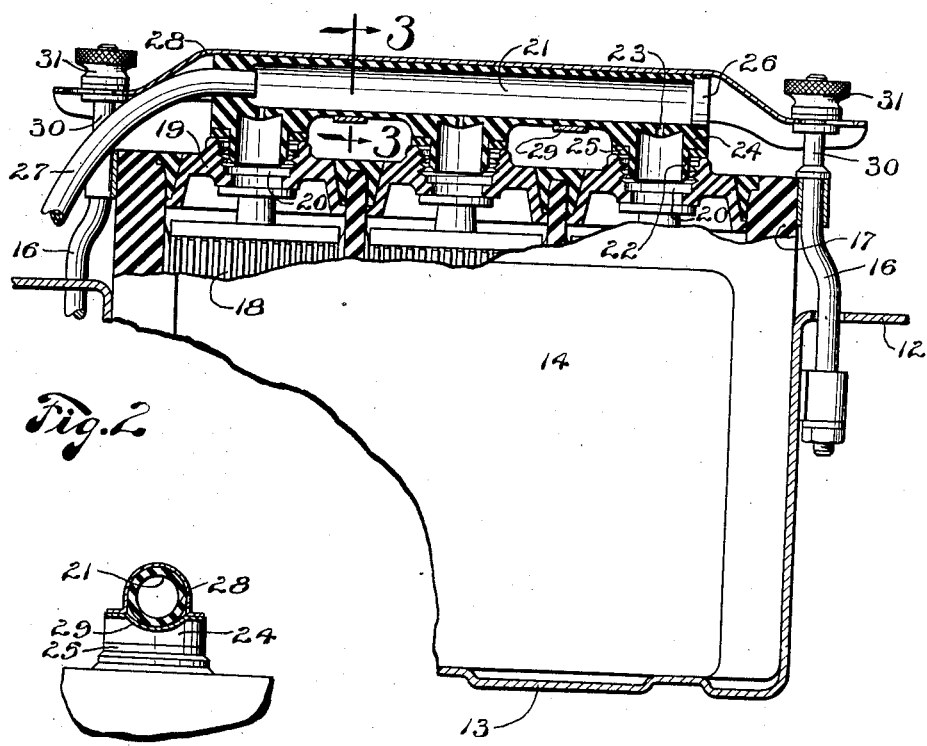
Figure 2 is, in part, a transverse sectional view through the three cells of the battery, showing the co-operation between my improved manifold and the top of the battery.
Figure 3:
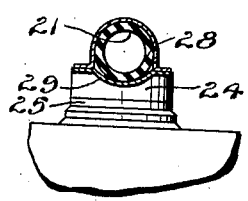
Figure 3 is a sectional view, taken upon the line 3—3 of Figure 2.

Referring to the accompanying drawing, I have used the reference numeral 10 to indicate the frame of a motor vehicle, which frame has a motor 11 mounted in its forward end. A dash 12 extends upwardly from the frame at the rear of the motor 11 and a shelf 13 is recessed in the upper portion of the dash 12 at one side of the motor 11 upon which shelf a battery 14 is located. The shelf 13 forms a pocket for holding the battery. A rectangular frame 15 of angle sections fits down over the top edge of the battery 14 and holds the battery down against the shelf 13 by means of a pair of bolts 16.

The battery 14 is of conventional form having a case 17 formed of a rubber composition with the battery cells moulded integrally therewith. A group of plates 18 fill each of the battery cells and a cover plate 19 formed of hard rubber forms an enclosure for the top of each cell, as in the conventional battery. Each of the cover plates 19 is provided with a central threaded opening 20, these openings formerly receiving filler caps to form closures for the openings. However, in my improved construction a single manifold extends over the three openings to form a closure for all three cells.

The manifold comprises a tube 21 which is formed of hard rubber and which extends over the three openings 20. Sleeves 22 are moulded integrally with the tube 21 and project transversely from the ends and from the center portion, respectively, of the tube. The upper end of each sleeve 22 communicates with the opening in the tube 21 by means of a relatively small vent 23, which vents are formed in the wall between the upper end of the sleeve 22 and and the bore of the tube 21. It will be noted that this wall is not flat but tapers downwardly in a conical shape so that drops of acid which may collect thereon will drip off and thereby be prevented from entering into the tube 21.

It will be noted that a shoulder 24 is formed around each sleeve 22 at its juncture with the tube 21, which shoulders bear against soft rubber gaskets 25 to form a seal between each cover 19 and the adjacent sleeve 22. A plug 26 is cemented into one end of the tube 21 and a soft rubber hose 27 is cemented into the other end of this tube, the hose 27 extending down from the top of the battery inside of the hood of the car to position just below the vehicle frame.

In order that the manifold may be held in position, I have provided a metal channel member 28 which extends across the top of the battery, the tube 21 being secured in this channel by means of brackets 29. A stud 30 extends upwardly from the top of each bolt 16, and the ends of the channel 28 have openings therein through which the studs 30 project so that a nut 31 may be screwed down over the upper end of each stud to clamp the channel 28 and manifold 21 in position over the top of the battery.

When it is desired to add water to the battery, the two nuts 31 are removed and the channel 28 and manifold 21 lifted bodily from the top of the battery, thereby leaving the three cells exposed for inspection or addition of water.

Among the many advantages arising from the use of my improved construction, it may be well to mention that all gases which are emitted from the battery plates are conducted through the hose 27 to a point below the frame of the vehicle. This prevents acids from collecting upon the engine and causing same to rust. Further, it will be apparent that, due to the relatively large size of the tube 21, all acids which may escape through the vents 23 will collect on the walls of the tube 21 and, when charging has ceased, will drip back through these openings into the battery. Thus there is practically no loss of acid from this battery. In this respect the construction is much superior to the ordinary battery cap because the acid which escapes through the vent holes is sprayed on the top of the battery and can never re-enter same.

Some changes may be made in the arrangement, construction, and combination of the various parts of my improved device without departing from the spirit of my invention, and it is my intention to cover by my claims such changes as may reasonably be included within the scope thereof.

I claim as my invention:

1. A device of the character described comprising, a storage battery having three cells therein, each of said cells having a filler opening in the upper cover thereof, a hard rubber tubular manifold extending across the top of said cells, said manifold having three sleeves extending laterally from points spaced therealong, said sleeves projecting into the respective filler openings of said battery, a flexible rubber gasket disposed around each of said sleeves between the adjacent cell and said manifold, whereby all of the gases from said cells will be conducted into said manifold, a bracket of channel cross-section extending across said battery and tightly fitting about said manifold, means associated with said bracket for securing said manifold within said channel, means associated with said battery for drawing said channel downwardly towards said battery, whereby said manifold will be detachably secured into position over said cells compressing said gaskets, a closure for one end of said manifold, and a flexible rubber hose extending from the other end of said manifold to a position spaced a material distance from said battery, for the purpose described.

2. A device of the character described comprising, a storage battery having a plurality of cells therein, each of said cells having a filler opening in the upper cover thereof, a hard rubber tubular manifold extending across the top of said cells, a plurality of sleeves moulded integrally with said manifold which project laterally from points spaced therealong, each of said sleeves being in communication with said tubular manifold by means of a relatively small vent opening in the manifold, a bracket of channel cross-section extending over the top of said battery and tightly fitting about said manifold, means for securing said manifold in said bracket, a flexible gasket disposed between each battery cell and said manifold, means for clamping said channel and manifold across the top of the battery in position so that said sleeves will extend into the respective filler openings of the battery and compress said gaskets whereby an air-tight seal is established between each cell and the adjacent sleeve, and a tube extending from said manifold to a position spaced a material distance from said battery, for the purpose described.

JOSEPH GALAMB.